United States Patent [19]
Yoshida et al.

[11] Patent Number: 6,097,678
[45] Date of Patent: Aug. 1, 2000

[54] INFORMATION RECORDING APPARATUS

[75] Inventors: Masayoshi Yoshida; Toshio Suzuki; Shigetaka Yoshida, all of Tokorozawa, Japan

[73] Assignee: Pioneer Electronic Corporation, Tokyo, Japan

[21] Appl. No.: 09/028,077

[22] Filed: Feb. 23, 1998

[30] Foreign Application Priority Data

Feb. 24, 1997 [JP] Japan ................................ 9-038754

[51] Int. Cl.[7] ...................................................... G11B 5/09
[52] U.S. Cl. ............................................. 369/47; 369/50
[58] Field of Search ................................ 369/47, 48, 50, 369/54, 275.4, 44.26, 44.13, 124

[56] References Cited

U.S. PATENT DOCUMENTS

| | | | |
|---|---|---|---|
| 5,109,369 | 4/1992 | Maeda et al. | 369/50 |
| 5,568,459 | 10/1996 | Takamori et al. | 369/50 |
| 5,703,851 | 12/1997 | Ando | 369/50 |
| 5,835,461 | 11/1998 | Kobayashi et al. | 369/48 |
| 5,844,882 | 12/1998 | Yoshida et al. | 369/275.4 |
| 5,852,599 | 12/1998 | Fuji | 369/275.4 |
| 5,940,364 | 8/1999 | Ogata et al. | 369/275.4 |

*Primary Examiner*—Thang V. Tran
*Attorney, Agent, or Firm*—Nixon & Vanderhye

[57] ABSTRACT

On a record medium, a moving control information to control a moving speed of a record medium when recording the record information onto the record medium is recorded by wobbling an information track at a frequency corresponding to the moving control information, and a record control information to control recording or reproducing the record information onto or from the record medium is also recorded in advance by forming a pre-pit on an adjacent track, which is adjacent to the information track. An information recording apparatus for recording the record information onto the record medium is provided with: a pickup device for simultaneously emitting a light beam onto the information track and the adjacent track and then outputting a reproduction signal based on a reflection light from the information track and the adjacent track of the emitted light beam; an information extracting device for extracting the moving control information from the outputted reproduction signal; a moving control device for controlling the moving speed of the record medium on the basis of the extracted moving control information; and a recording device for recording the record information onto the record medium while the record medium is moved at the controlled moving speed.

7 Claims, 8 Drawing Sheets

DEFECT DETECTOR

INFORMATION RECORDING APPARATUS

BACKGROUND OF THE INVENTION

1. Field of the Invention

The present invention relates to an information recording apparatus for recording record information such as video information, audio information or the like to be principally recorded, by reproducing address information or synchronization signal necessary for a positional retrieval when recording the record information (hereinafter, referred to as "pre-information") or rotational control information for a rotational control of the record medium, onto the record medium of postscript WO (Write Once) type on which the pre-information or the rotational control information is recorded in advance (hereafter, referred to as a DVD-R (DVD-Recordable)) among high density record media represented by the DVD whose record density is drastically improved as compared with a conventional CD (Compact Disk) and the like.

2. Description of the Related Art

There is a CD-R (CD-Recordable) as an optical disk having a record capacity similar to that of the CD, on which the pre-information is recorded beforehand and onto which the postscript information can be recorded afterward in accordance with the pre-information.

In the CD-R, at a pre-formatting step of manufacturing the CD-R, an information track (a groove track or a land track), onto which the record information is to be recorded, is wobbled into a wave shape at a frequency corresponding to a signal into which the pre-information to be recorded is beforehand FM (Frequency Modulation)-modulated, so that the pre-information is recorded.

When the record information is actually recorded onto the conventional CD-R, a wobbling frequency of the wobbled track is detected. A standard clock to rotation-control the CD-R is extracted on the basis of the detection. A drive signal to rotation-control a spindle motor for rotating the CD-R is generated on the basis of the extracted standard clock.

Moreover, as for the address information indicative of an address on the CD-R required when recording the record information, the pre-information is reproduced when recording the record information. Then, a position to be recorded is detected on the basis of the reproduced pre-information, to thereby record the record information.

On the other hand, in a case of the DVD-R which is recently being developed, an information track (for example, a groove track) in the DVD-R is wobbled at a frequency on the basis of the standard clock, so that the rotational control information is recorded thereon. In addition, the pre-information is recorded by forming a pre-pit corresponding to the pre-information on a track (for example, a land track) between the two information tracks.

However, when recording the record information onto the DVD-R, if emitting a light beam to the information track to thereby detect a signal which includes a wobbling frequency component (hereafter, referred to as a wobbling signal) of the information track, one portion of the light beam is also emitted onto the pre-pit on a track adjacent to the information track. This results in one problem that a signal corresponding to the pre-pit is mixed into the wobbling signal detected from the information track so that the wobbling signal with an excellent quality cannot be detected.

Moreover, since the signal itself corresponding to the pre-pit has an impulse characteristic (i.e., such a characteristic that a signal is uniformly distributed over a whole frequency band area), there is another problem that the signal corresponding to the pre-pit cannot be removed only by a simple filter means.

SUMMARY OF THE INVENTION

The present invention is proposed in view of the above mentioned problems. It is therefore an object of the present invention to provide an information recording apparatus, which can exactly record the record information onto a record medium such as a DVD-R or the like, on which the pre-information is recorded by the pre-pit and the wobbling signal is further recorded in advance, by controlling the recording operation while detecting the wobbling signal surely and exactly,.

The above object of the present invention can be achieved by an information recording apparatus for recording record information onto a record medium such as a DVD-R or the like, on which a moving control information to control a moving speed of the record medium when recording the record information onto the record medium is recorded by wobbling an information track such as a groove track or the like, where the record information is to be recorded on the record medium, at a frequency corresponding to the moving control information, and on which a record control information to control recording or reproducing the record information onto or from the record medium is also recorded in advance by forming a pre-pit on an adjacent track such as a land track or the like, which is adjacent to the information track. The information recording apparatus is provided with: a pickup device such as an optical pickup or the like for simultaneously emitting a light beam onto the information track and the adjacent track and then outputting a reproduction signal based on a reflection light from the information track and the adjacent track of the emitted light beam; an information extracting device such as a limiter or the like for extracting the moving control information from the outputted reproduction signal; a moving control device such as a servo circuit or the like for controlling the moving speed of the record medium on the basis of the extracted moving control information; and a recording device such as an optical pickup or the like for recording the record information onto the record medium while the record medium is moved at the controlled moving speed.

According to the information recording apparatus, the light beam is simultaneously emitted by the pickup device onto the information track and the adjacent track, and the reproduction signal based on the reflection light from the information track and the adjacent track of the emitted light beam is outputted by the pickup device. Then, the moving control information is extracted from the outputted reproduction signal by the information extracting device. Then, the moving speed of the record medium is controlled by the moving control device on the basis of the extracted moving control information. Finally, while the record medium is moved at the controlled moving speed, the record information is recorded onto the record medium by the recording device.

Therefore, even in case of a record medium on which the record control information (which exhibits the impulse characteristic in the reproduction signal) is recorded on the adjacent track, it is still possible to record the record information onto the information track on the basis of the exactly extracted moving control information. Thus, while the recording operation for the record information can be exactly controlled, the record information can be surely recorded onto the record medium.

In one aspect of the information recording apparatus, the information extracting device is provided with: a generating device such as a limit level generator or the like for generating a limit signal, which has a limit level corresponding to the outputted reproduction signal to remove a signal corresponding to the record control information out of the outputted reproduction signal; a limiting device such as a limitter or the like for limiting a level of the outputted reproduction signal on the basis of the generated limit signal to thereby output a limit reproduction signal; and an extracting device such as a band pass filter or the like for extracting the moving control information out of the outputted limit reproduction signal.

According to this aspect, the limit signal is generated out of the outputted reproduction signal by the generating device. Then, the level of the outputted reproduction signal is limited on the basis of the generated limit signal by the limiting device, so that the limit reproduction signal is outputted by the limit device. Finally, the moving control information is extracted out of the outputted limit reproduction signal by the extracting device. Therefore, by limiting the level of the reproduction signal by use of the limit signal, the moving control information can be surely extracted in spite of the existence of the record control information on the adjacent track.

In another aspect of the information recording apparatus, the information recording apparatus is further provided with: a detecting device such as a defect detector or the like for detecting whether or not a noise reproduction signal, which is the outputted reproduction signal having a level beyond a level range set in advance, is outputted to thereby output a detection signal indicating that the noise reproduction signal is outputted; and an outputting device such as a switch or the like for outputting a previous reproduction signal, which is the outputted reproduction signal previous to the noise reproduction signal, to the information extracting device when the detection signal is outputted.

According to this aspect, it is detected by the detecting device whether or not the noise reproduction signal is outputted. If the noise reproduction signal is outputted, the detection signal is outputted. When the detection signal is outputted, the previous reproduction signal is outputted to the information extracting device in place of the noise reproduction signal (i.e. the currently outputted reproduction signal) by the outputting device. Therefore, it is possible to prevent the noise reproduction signal from influencing the detection of the moving control information.

In another aspect of the information recording apparatus, the record control information includes record position information indicative of a position on the record medium where the record information is to be recorded.

According to this aspect, at the time of recording the record information, it is possible to exactly control the moving speed of the record medium and exactly recognize the position on the record medium where the record information is to be recorded by use of the record position information, so as to exactly record the record information.

In another aspect of the information recording apparatus, the record medium is a record medium shaped in a disc, the information recording apparatus is further provided with a rotating device for rotating the record medium when recording the record information onto the record medium under a control of the moving control device, and the moving control information is rotational control information to control a rotational number of the record medium.

According to this aspect, when recording the record information onto the record medium, the record medium shaped in the disc is rotated by the rotating device under the control of the moving control device. At this time, the moving control information is the rotational control information to control a rotational number of the record medium. Therefore, it is possible to exactly control the rotation of the record medium shaped in the disc, and record the record information.

In another aspect of the information recording apparatus, the record medium may be a DVD such as a DVD-R.

According to this aspect, it is possible to exactly control the rotation of the DVD, and record the record information onto the DVD.

In another aspect of the information recording apparatus, one of the information track and the adjacent track is one of a land track and a groove track formed on the record medium, and the other of the information track and the adjacent track is the other of the land track and the groove track.

According to this aspect, the light beam is simultaneously emitted by the pickup device onto the groove track and the land track, and the reproduction signal based on the reflection light from the groove track and the land track of the emitted light beam is outputted by the pickup device. Therefore, even in case of the record medium on which the record control information is recorded on the land track (or the groove track), it is still possible to record the record information onto the groove track (or the land track) on the basis of the exactly extracted moving control information. Thus, while the recording operation for the record information can be exactly controlled, the record information can be surely recorded onto the record medium.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments for the present invention are explained with reference to the drawings.

(I) Record Medium

At first, a DVD-R as one example of a record medium for use in embodiments, on which a pre-pit is formed in correspondence with pre-information as record control information and on which rotational control information is also recorded by wobbling a groove track described later at a predetermined frequency is explained with reference to FIGS. 1 and 2.

At first, a structure of the DVD-R is explained with reference to FIG. 1.

Figure 1:
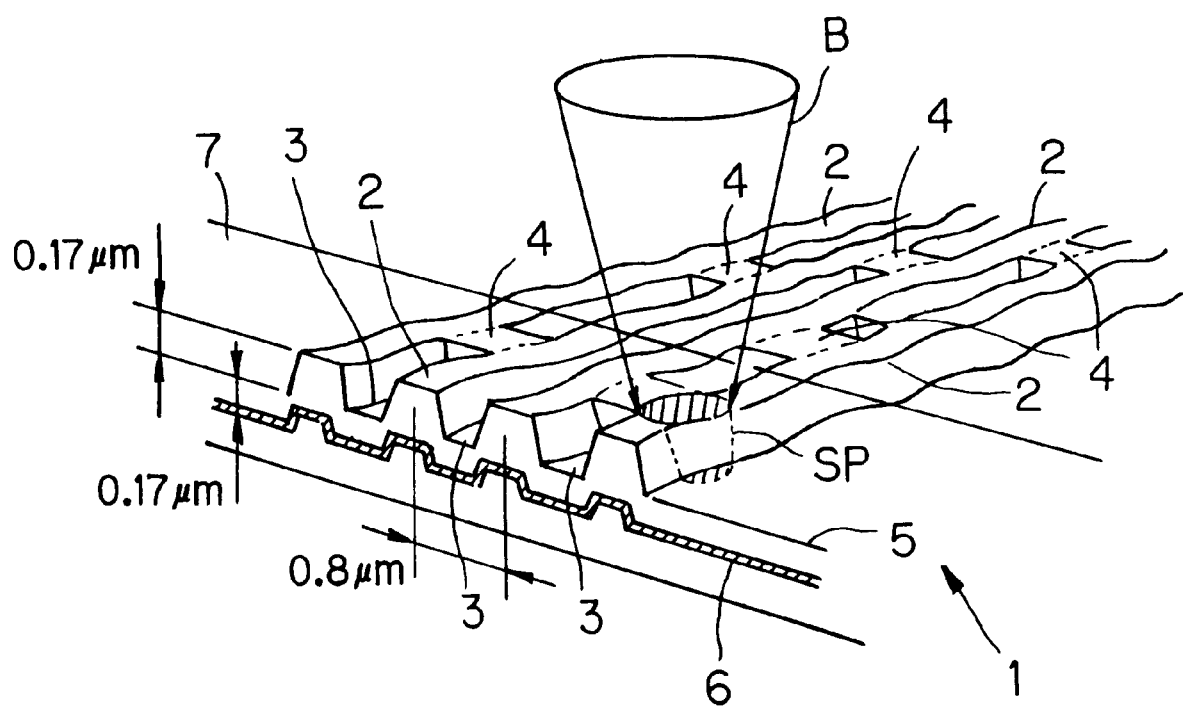
FIG. 1 is a perspective view showing one example of a configuration of a DVD-R for use in embodiments.

In FIG. 1, a DVD-R 1 is a pigment type of DVD-R which has a pigment film 5 and onto which information can be written only once. In the DVD-R 1, there is formed a groove track 2 servicing as an information track and a land track 3 servicing as an adjacent track to guide to the groove track 2 a light beam B, such as a laser beam or the like as a reproducing light or a recording light. Moreover, the DVD-R 1 has: a protection film 7 to protect the groove track 2 and the land track 3; and a metallic deposition surface 6 to reflect the light beam B when reproducing the recorded information. A pre-pit 4 corresponding to pre-information is formed on the land track 3. This pre-pit 4 is beforehand formed before a shipment of the DVD-R 1.

Moreover, in the DVD-R 1, the groove track 2 is wobbled at a frequency corresponding to a rotational speed of the DVD-R 1. The recording operation of the rotational control information by wobbling the groove track 2 is beforehand executed before the shipment of the DVD-R 1, similarly to the pre-pit 4.

When recording the record information (hereafter, this implies the information, such as video information, audio information and the like to be principally recorded other than the pre-information and the rotational control information) onto the DVD-R 1, a frequency in wobbling of the groove track 2 is detected by an information recording apparatus described later, to thereby obtain the rotational control information and the DVD-R 1 is rotation-controlled at a predetermined rotational speed. Further, the pre-pit 4 is detected to beforehand obtain the pre-information to thereby set an optimum output of the light beam B servicing as the recording or reproducing light in accordance with the obtained pre-information. Furthermore, the address information indicative of the position on the DVD-R 1 onto which the record information is to be recorded is obtained. The record information is then recorded onto the corresponding record position on the basis of this obtained address information.

When recording the record information, the light beam B is emitted such that a center thereof coincides with the center of the groove track 2. Then, a record information pit corresponding to the record information is formed on the groove track 2 to thereby record the record information. At this time, a size of a light spot SP is set such that one portion of the light spot SP is emitted not only onto the groove track 2 but also onto the land track 3, as shown in FIG. 1. Then, the pre-information is detected from the pre-pit 4 by a push-pull method (a push-pull method using a light detector divided by a division line parallel to a rotational direction of the DVD-R 1 (hereafter, referred to as "a radial push-pull method")) using some of the reflection light from the light spot SP on the land track 3 to thereby obtain the pre-information. Further, the wobbling signal is detected from the groove track 2 by using the reflection light from the light spot SP on the groove track 2 to thereby obtain a clock signal for the rotation control.

Next, a record format of the pre-information and the rotational control information recorded in advance on the DVD-R 1 for use in the embodiments is explained with reference to FIG. 2. In FIG. 2, an upper block shows the record format for the record information, each of wave forms in wave shapes at a lower block shows a wobbling state at the groove track 2 on which the record information is to be recorded (i.e., corresponding to a plan view of the groove track 2), and upward arrows between the wobbling state of the groove track 2 and the record information schematically show positions on which the pre-pits 4 are formed respectively. In FIG.2, the wobbling state of the groove track 2 is indicated by using an amplitude higher than an actual amplitude for the purpose of an easy understanding. The record information is recorded on a central line of the groove track 2.

Figure 2:
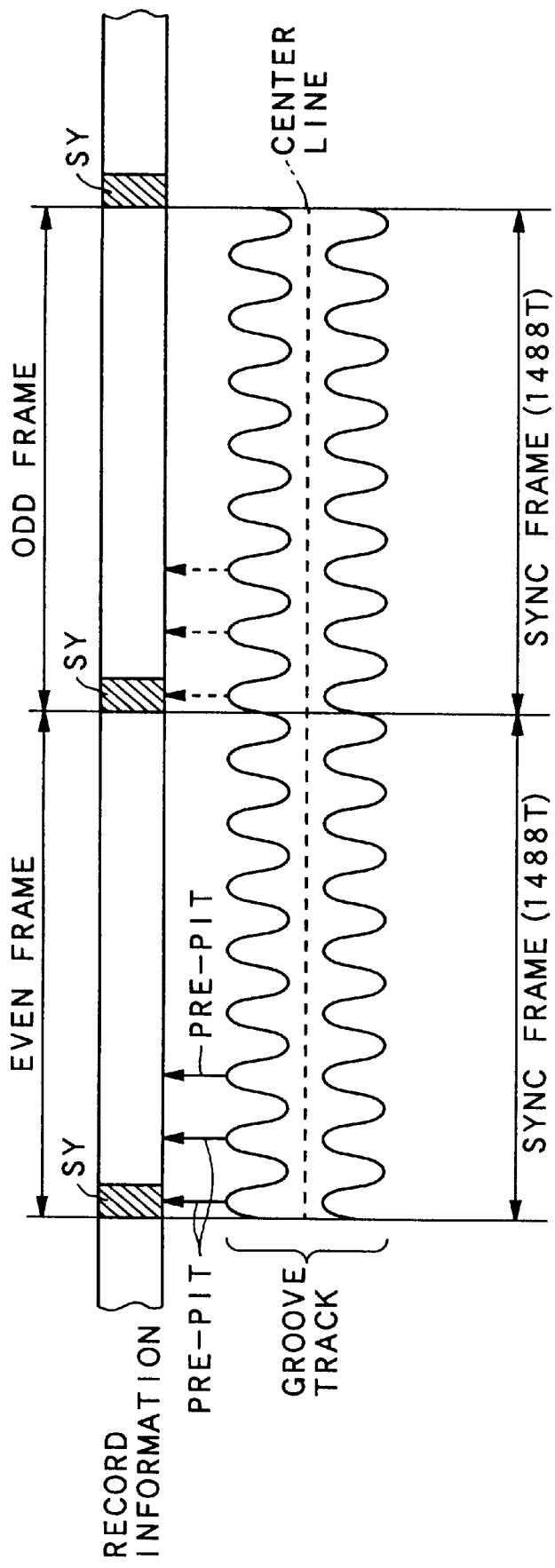
FIG. 2 is a diagram showing one example of a record format of the DVD-R for use in the embodiments.

As shown in FIG. 2, the record information recorded on the DVD-R 1 in the embodiment is divided in advance for each synchronization frame as an information unit. And that, one recording sector is composed of 26 synchronization frames. Moreover, one ECC (Error Correcting Code) block is composed of 16 recording sectors. One synchronization frame has a length equal to 1488 times (1488T) of the unit length (hereafter, referred to as T) corresponding to a pit interval prescribed by the record format when recording the record information. Furthermore, a synchronization information SY to achieve a synchronization for each synchronization frame is recorded on a portion having a length of 14T at the leading head of one synchronization frame.

On the other hand, the pre-information recorded on the DVD-R 1 in the embodiment is recorded for each synchronization frame. Whenever recording the pre-information by means of the pre-pit 4, one pre-pit 4 to indicate a synchronization signal in the pre-information is formed on a land track 3 adjacent to an area on which the synchronization information SY in each synchronization frame in the record information is recorded. Further, two or one pre-pit 4 to indicate a content of the pre-information to be recorded (address information) is formed on a land track 3 adjacent to a former portion within the synchronization frame other than the synchronization information SY (incidentally, as for the former portion within the synchronization frame other than the synchronization information SY, there may be a case that the pre-pit 4 is not formed depending upon the content of the pre-information to be recorded). At this time, in the embodiment, in one recording sector, the pre-pit 4 is formed only on the synchronization frames having an even number (hereafter, referred to "an EVEN frame") or only on the synchronization frames having an odd number (hereafter, referred to as "an ODD frames"), so that the pre-information is recorded. Namely, in FIG. 2, if the pre-pit 4 is formed on the EVEN frame (shown by upward solid arrows in FIG.2), the pre-pits 4 are not formed on the ODD frames adjacent to the EVEN frame.

On the other hand, the groove track 2 is wobbled at a constant wobbling frequency $f_0$ of 140 kHz (i.e., a frequency at which one synchronization frame corresponds to 8 waves) over all the synchronization frames. Then, a signal for the rotational control of the spindle motor is detected by detecting the constant wobbling frequency $f_0$, in the information recording apparatus described later.

(II) First Embodiment of Information Recording Apparatus

Next, a first embodiment of the information recording apparatus according to the present invention is explained with reference to FIGS. 3 to 6. Hereinbelow, an embodiment is explained in which the present invention is applied to an information recording apparatus for recording digital information sent from a host computer onto the DVD-R 1.

At first, a whole configuration and operation of the information recording apparatus as the first embodiment is explained with reference to FIG. 3. In the embodiment described below, the pre-pit 4 containing the address information on the DVD-R 1 and the groove track 2 which wobbles are formed beforehand on the DVD-R 1. When recording the digital information, the pre-pit 4 is detected at first to thereby obtain the address information on the DVD-R 1, and then the record position is detected, at which the digital information i.e., the record information is recorded onto the DVD-R 1.

Figure 3:
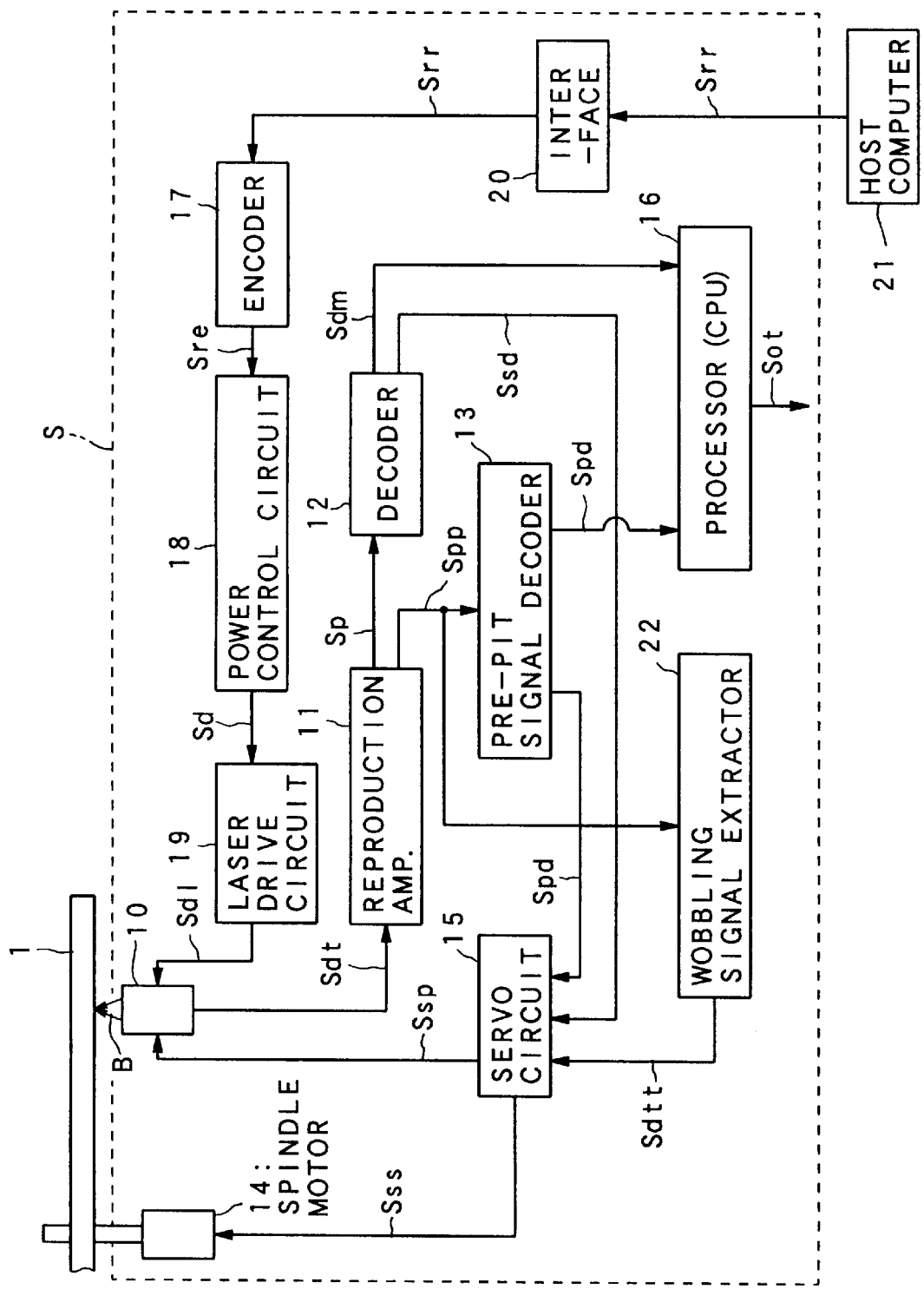
FIG. 3 is a block diagram showing a schematic configuration of an information recording apparatus in the embodiments.

As shown in FIG. 3, an information recording apparatus S as the first embodiment is provided with: a pickup 10 servicing as one example of a pickup device and a recording device; a reproduction amplifier 11; a decoder 12; a pre-pit signal decoder 13; a spindle motor 14 servicing as one example of a rotating device; a servo circuit 15 servicing as one example of a moving control device; a processor (CPU) 16; an encoder 17; a power control circuit 18; a laser drive circuit 19; an interface 20; and a wobbling signal extractor 22 servicing as one example of an information extracting device. A digital information Srr to be recorded from an external host computer 21 is inputted through the interface 20 to the information recording apparatus S.

Next, the whole operation is explained.

The pickup 10 is provided with a laser diode, a polarization beam splitter, an objective lens, a light detector and so on which are not shown, and emits the light beam B to the information record surface of the DVD-R 1 on the basis of a laser drive signal Sd1. On the basis of a reflection light of the light beam B, the pickup 10 detects the wobbling frequency of the groove track 2 and the pre-pit 4 by using the radial push-pull method, and thereby records the digital information Srr to be recorded. Further, if the digital information is already recorded, the pickup 10 detects the already recorded digital information on the basis of the reflection light of the light beam B.

The reproduction amplifier 11 amplifies a detection signal Sdt including the information corresponding to the wobbling frequency of the groove track 2 and the pre-pit 4 outputted by the pickup 10, and then outputs a pre-information signal Spp corresponding to the wobbling frequency of the groove track 2 and the pre-pit 4. Further, if the digital information is already recorded, the reproduction amplifier 11 outputs an amplification signal Sp corresponding to the already recorded digital information.

After that, the decoder 12 applies an 8–16 demodulation and a de-interleave operation to the amplification signal Sp so as to decode the amplification signal Sp, and thereby outputs a demodulation signal Sdm and a servo demodulation signal Ssd.

On the other hand, the pre-pit signal decoder 13 extracts only a signal obtained by detecting the pre-pit 4 contained in the pre-information signal Spp, and then decodes it to thereby output a corresponding demodulation pre-pit signal Spd.

The servo circuit 15 outputs a pickup servo signal Ssp for a focus servo control and a tracking servo control in the pickup 10, on the basis of the demodulation pre-pit signal Spd and the servo demodulation signal Ssd. Moreover, on the basis of an extraction signal Sdtt described later, the servo circuit 15 uses the information corresponding to the wobbling frequency $f_0$, included in the extraction signal Sdtt and then outputs a spindle servo control signal Sss to thereby servo-control the rotation of the spindle motor 14.

On the other hand, the interface 20 performs, under a control of the processor 16, an interface operation for the digital information Srr sent from the host computer 21 i.e., taking this into the information recording apparatus S to thereby output the digital information Srr to the encoder 17.

The encoder 17 is provided with an ECC generator, an 8–16 modulator, a scrambler and the like which are not shown, and constitutes the ECC block which is a unit to perform an error correction when reproducing, on the basis of the digital information Srr, and further applies the interleave, 8–16 modulation and scramble processes to the ECC block to thereby generate a modulation signal Sre.

After that, on the basis of the modulation signal Sre, the power control circuit 18 outputs a record signal Sd of controlling an output of a laser diode (not shown) within the pickup 10.

Moreover, on the basis of the record signal Sd, the laser drive circuit 19 outputs the laser drive signal Sd1 of actually driving the laser diode so that the laser diode in the pickup 10 emits the light beam B.

On the other hand, the wobbling signal extractor 22 extracts only the wobbling frequency of the groove track 2 included in the pre-information signal Spp to thereby output the extraction signal Sdtt to the servo circuit 15.

Finally, the processor 16 uses the inputted demodulation pre-pit signal Spd and then obtains the pre-information to thereby control the operation of recording the digital information Srr at the position on the DVD-R 1 corresponding to the address information included in the pre-information. In parallel to these operations, the processor 16 outputs a reproduction signal Sot corresponding to the digital information, which has been already recorded, to the external on the basis of the demodulation signal Sdm and mainly controls the information recording apparatus S as a whole.

The information recording apparatus S can also reproduce the information recorded on the DVD-R 1. At that time, the reproduction signal Sot is outputted to the external through the processor 16 on the basis of the modulation signal Sdm.

Next, a detailed configuration of the wobbling signal extractor 22 in the first embodiment is explained with reference to FIGS. 4A, 4B, 5A and 5B.

Figure 4A:
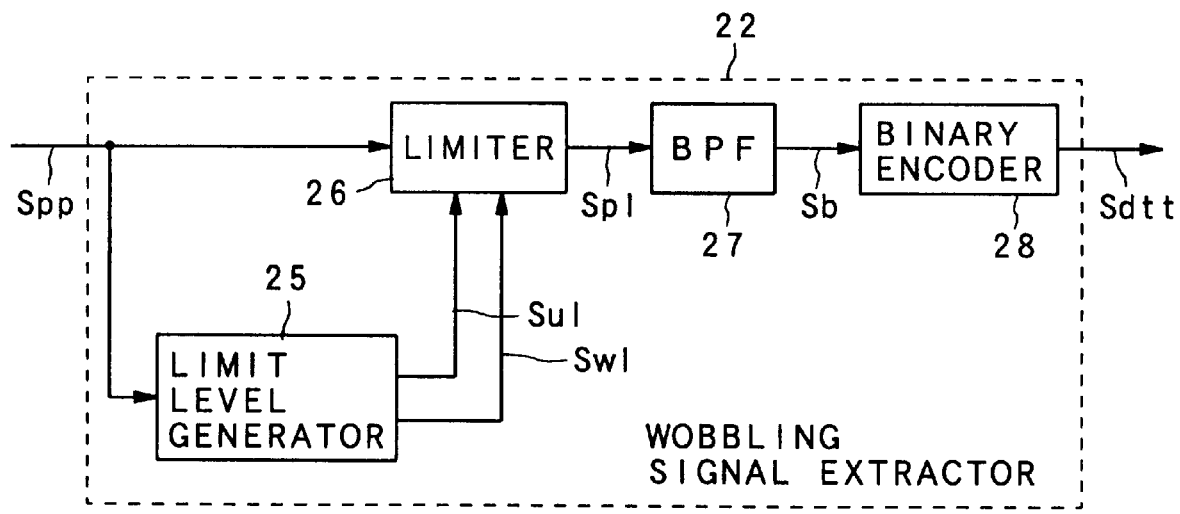
FIG. 4A is a block diagram showing a schematic configuration of a wobbling signal extractor in a first embodiment.

As shown in FIG.4A, the wobbling signal extractor 22 is provided with: a limit level generator 25 servicing as one example of a generating device for generating an upper side limit signal Su1 and a lower side limit signal Sw1, which change in accordance with a change of the pre-information signal Spp (in which a signal corresponding to the pre-pit 4 is superimposed on a signal corresponding to the wobbling signal of the groove track 2) and which limit an amplitude variation of the pre-information signal Spp to thereby remove the signal corresponding to the pre-pit 4 from the pre-information signal Spp; a limiter 26 servicing as one example of a limiting device for limiting the amplitude variation of the pre-information signal Spp by use of the upper side limit signal Su1 and the lower side limit signal Sw1 from the limit level generator 25, to thereby output a limit pre-information signal Sp1: a BPF (Band Pass Filter) 27 servicing as one example of an extracting device for removing the high frequency component included in the limit pre-information signal Sp1 from the limit pre-information signal Sp1 to thereby output a wobbling signal Sb corresponding to the wobbling frequency of the groove track 2; and a binary encoder 28 for converting the wobbling signal Sb into a binary value to thereby output the extraction signal Sdtt.

Figure 4B:
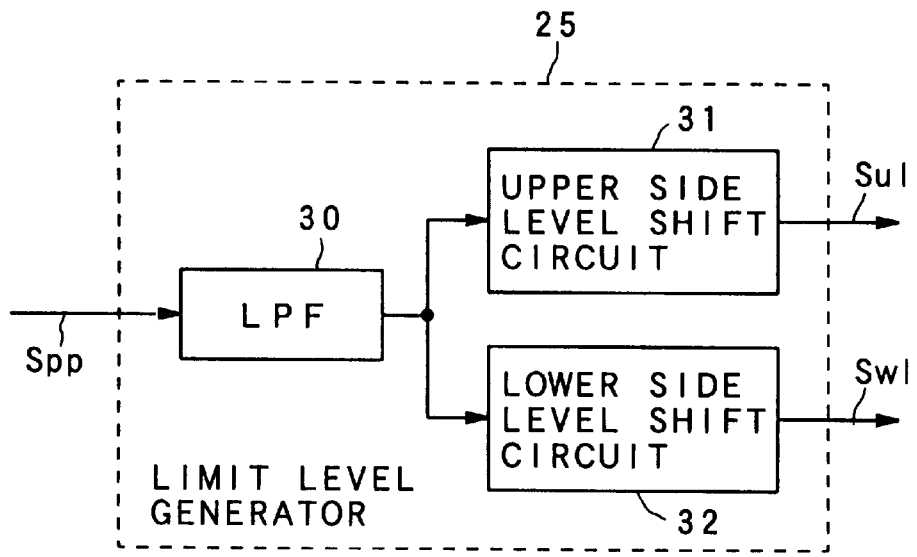
FIG. 4B is a block diagram showing a schematic configuration of a limit level generator in the first embodiment.

Moreover, as shown in FIG. 4B, the limit level generator 25 is provided with: an LPF (Low Pass Filter) 30 for extracting only the low frequency component of the pre-information signal Spp; an upper side level shift circuit 31 for shifting the amplitude (level) of the low frequency component of the extracted pre-information signal Spp by a predetermined amount so as to make the level higher and then outputting the upper side limit signal Su1; and a lower side level shift circuit 32 for shifting the amplitude (level) of the low frequency component of the extracted pre-information signal Spp by a predetermined amount so as to make the level lower and then outputting the lower side limit signal Sw1.

If the LPF 30 is an LPF capable of extracting a signal having a frequency substantially similar to the wobbling frequency of the groove track 2 by removing the high frequency component from the pre-information signal Spp, the LPF 30 may be an LPF having the conventional configuration.

Figure 5A:
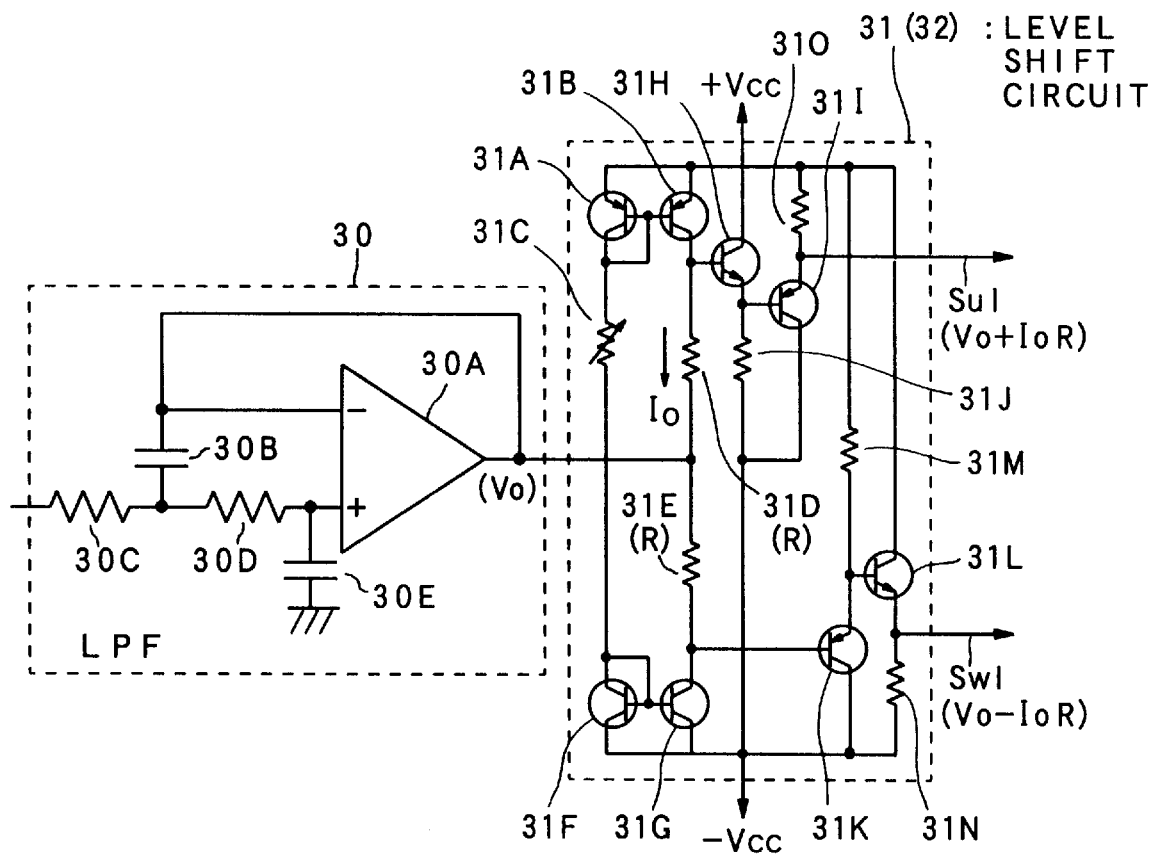
FIG. 5A is a circuit diagram showing a configuration of the limit level generator in the first embodiment.

More actually, as in one example shown in FIG. 5A, it may be provided with a positive amplifier 30A, resistors 30C and 30D, and capacitors 30B and 30E.

More actually, for example, as in the example shown in FIG. 5A, the upper side level shift circuit 31 and the lower side level shift circuit 32 are implemented as an integrally discrete circuit.

Namely, as shown in FIG. 5A, the discrete circuit corresponding to the upper side level shift circuit 31 and the lower side level shift circuit 32 are provided with: transistors 31A and 31B constituting a constant current source; transistors 31F and 31G constituting a constant current source; transistors 31H and 31I servicing as one example of a buffer circuit and a diode circuit; transistors 31K and 31L servicing as one example of a buffer circuit and a diode circuit; resistors 31D, 31E, 31M, 31N and 31O; and a variable resistor 31C. In this configuration, the transistors 31A, 31B, 31H, 31I and the like function as the upper side level shift circuit 31, and the transistors 31F, 31G, 31K, 31L and the like function as the lower side level shift circuit 32. Then, the upper side limit signal Su1 is obtained as an emitter signal of the transistor 31I, and the lower side limit signal Sw1 is obtained as an emitter signal of the transistor 31L. At this time, when letting a value of a current flowing through the resistor 31D (which resistance value is assumed to be R) be IO and an output voltage of the positive amplifier 30A be VO, a voltage value of the upper side limit signal Su1 is $(V_0+I_0R)$, and a voltage value of the lower side limit signal Sw1 is $(V_0-I_0R)$.

Figure 5B:
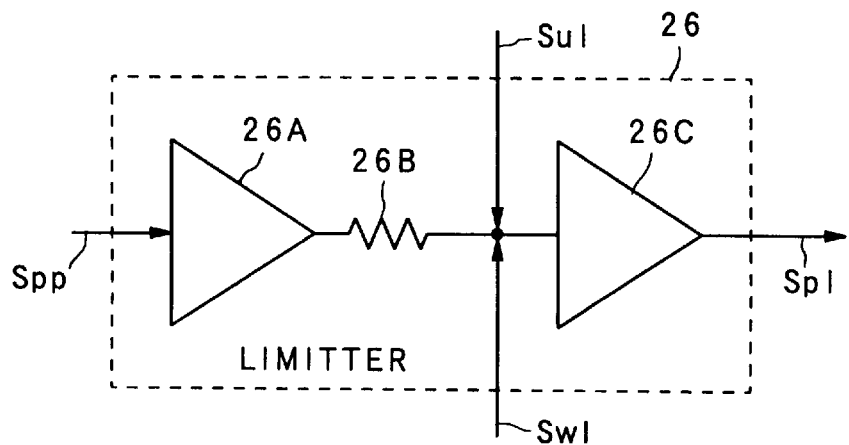
FIG. 5B is a circuit diagram showing a configuration of a limiter in the first embodiment.

Next, a configuration of the limiter 26 is explained with reference to FIG. 5B. The limiter 26 is provided with: an impedance converter 26A for functioning as a so-called buffer for the pre-information signal Spp; a resistor 26B; and an impedance converter 26C to which a synthesis signal of the upper side limit signal Su1, the lower side limit signal Sw1 and an output signal from the resistor 26B are inputted and which functions as a buffer similarly to the impedance converter 26A to thereby output the limit pre-information signal Sp1.

Next, operations of the wobbling signal extractor 22 are explained with reference to FIG. 6.

As mentioned above, as shown in a top row of FIG. 6, the pre-information signal Spp inputted to the wobbling signal extractor 22 includes the high frequency component, which includes a noise when detecting (e.g., a ripple component of a high frequency in the top row of FIG. 6) and noise signals resulting from the pre-pit 4 (an impulse component shown by symbols Sn1, Sn2 in the top row of FIG.6), in addition to the component of the frequency corresponding to the wobbling frequency of the groove track 2 (e.g., a ripple component of a low frequency in the top row of FIG. 6). Among them, the noise signal Sn1 shown in the top row of FIG. 6 is a noise signal resulting from the pre-pit 4 on the land track 3 adjacent to the groove track 2 to which the light beam B is emitted when detecting the pre-information signal Spp, and the noise signal Sn2 shown in the top row of FIG.6 is a noise signal resulting from the pre-pit 4 on the land track 3 located at an opposite side of the land track 3, on which the pre-pit 4 causing the noise signal Sn1 exists, with respect to the groove track 2. Each of these noise signals Sn1 and Sn2 has the characteristic that the signal is uniformly distributed over the whole frequency band area as mentioned above.

Then, in the wobbling signal extractor 22, the pre-information signal Spp is inputted to the limit level generator 25, which generates the upper side limit signal Su1 and the lower side limit signal Sw1. The upper side limit signal Su1 and the lower side limit signal Sw1 mutually have predetermined level widths as shown in a second row from the top of FIG. 6 by virtue of the LPF 30, the upper side level shift circuit 31 and the lower side level shift circuit 32, which are contained in the limit level generator 25. The setting manner of this predetermined level width is described later.

Then, the upper side limit signal Su1 and the lower side limit signal Sw1 are used as limit signals for the level limit in the limiter 26. Then, the level of the pre-information signal Spp is limited by the limiter 26 to thereby attenuate the noise signals Sn1 and Sn2, so that the limit pre-information signal Sp1 shown in a third row from the top of FIG. 6 is generated. At this step, the noise signals Sn1 and Sn2 are attenuated.

After that, the limit pre-information signal Sp1 in which the noise signals Sn1 and Sn2 are attenuated is inputted to the BPF 27. Then, the high frequency component is removed, and the wobbling signal Sb (shown in a fourth row from the top of FIG. 6) is outputted. This is converted into the binary value by the binary encoder 28, and is outputted to the servo circuit 15 as the extraction signal Sdtt (shown in the lowest row of FIG. 6), which is used for a spindle servo control by detecting a cycle of an inversion between the binary values in the extraction signal Sdtt.

The reason why in this embodiment, after the level is limited by using the upper side limit signal Su1 and the lower side limit signal Sw1, the wobbling signal Sb is obtained by using the BPF 27 is as following. That is, if the pre-information signal Spp would be inputted to the BPF 27 while maintaining its original state, the noise signals Sn1 and Sn2 cannot be sufficiently removed because of the wide band areas of the noise signals Sn1 and Sn2. Hence, after energies of the noise signals Sn1 and Sn2 are attenuated by the upper side limit signal Su1 and the lower side limit signal Sw1, the pre-information signal Spp is inputted to the BPF 27.

Next, the setting manner of the predetermined level widths in the upper side limit signal Su1 and the lower side limit signal Sw1 is explained.

It is ideally desirable that the predetermined level width is "0" in order to attain the purpose as the wobbling signal extractor 22 of the present embodiment, namely, to remove the noise signals Sn1 and Sn2. That is, the output signal from the LPF 30 in the limit level generator 25 is used, while maintaining its original state, as the upper side limit signal Su1 and the lower side limit signal Sw1, so that a signal in which the level of the pre-information signal Spp is limited by the upper side limit signal Su1 (=the lower side limit signal Sw1) is outputted to the BPF 27 to thereby reduce the effect of the noise signals Sn1 and Sn2.

However, in fact, for example, the irregularity or the like sometimes occurs in the voltage effect of the transistor 31I or 31L (which functions as the diode circuit) shown in FIG. 5A. Thus, even if trying to limit the pre-information signal Spp by using any one of the limit signals (the upper side limit signal Su1 or the lower side limit signal Sw1), the width is finally generated when limiting.

Then, in the wobbling signal extractor 22 of the first embodiment, a certain width is positively set between the upper side limit signal Su1 and the lower side limit signal Sw1, in order to absorb the irregularity and the like. At that time, an upper limit value of the width is set such that an energy of the noise signal Sn1 or Sn2 is approximately $\frac{1}{10}$ of the energy of the wobbling signal Sb to be extracted. More actually, for example, the limit pre-information signal Sp1 outputted by the limiter 26 is measured by using a spectrum analyzer and the like, and the resistance value of the variable resistor 31C is set such that an energy density spectrum of the noise signal Sn1 or Sn2 is approximately $\frac{1}{10}$ of the energy spectrum of the wobbling signal Sb. Here, the value of approximately $\frac{1}{10}$ is experimentally determined. If the energy density spectrum of the noise signal Sn1 or Sn2 is set equal to or less than that value, it is possible to substantially inhibit the noise signal Sn1 or Sn2.

Figure 6:
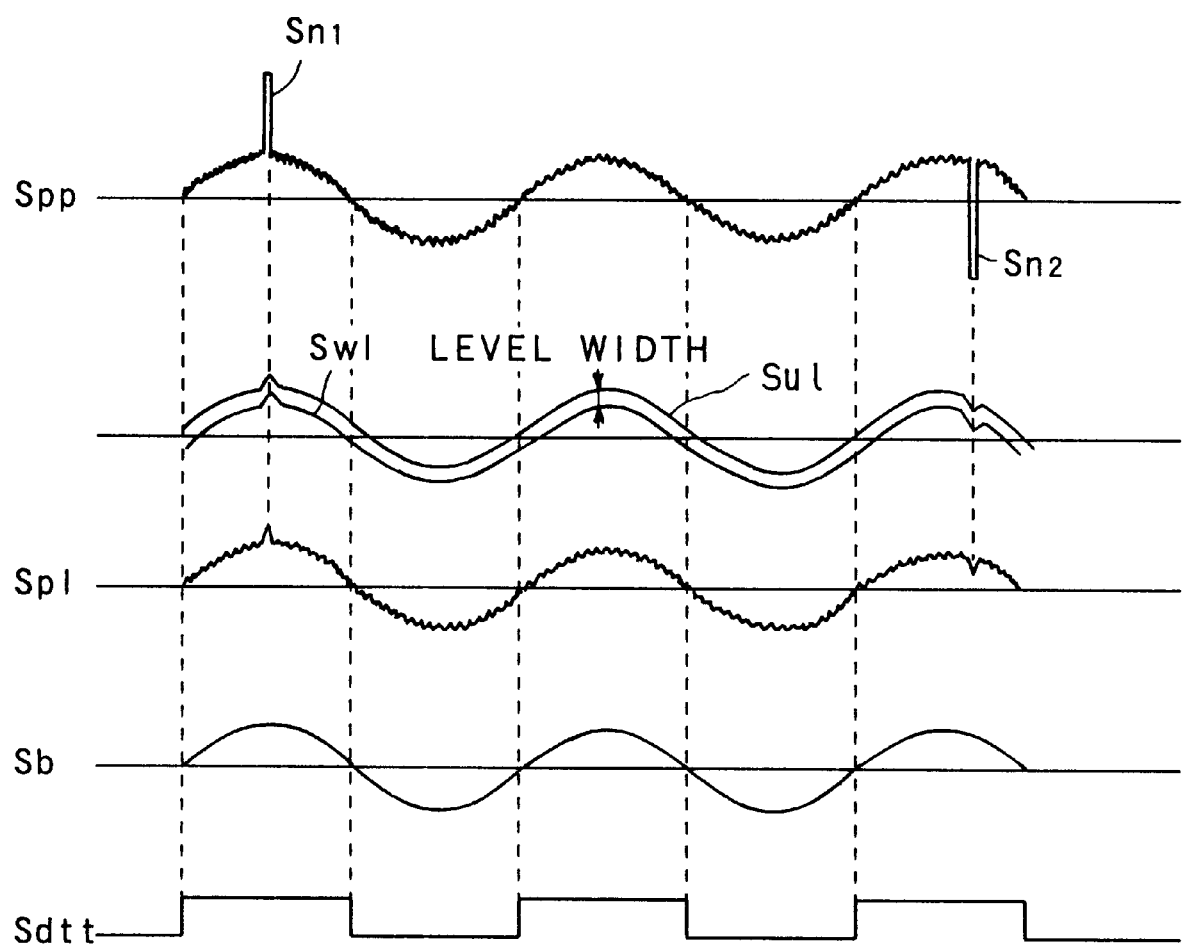
FIG. 6 is a timing chart showing an operation of the wobbling signal extractor in the first embodiment.

Incidentally, the pre-information signal Spp shown in FIG. 6 is also inputted to the pre-pit signal decoder 13. In the pre-pit signal decoder 13, a predetermined threshold is set to the inputted pre-information signal Spp to thereby extract only the noise signal Sn1 (which corresponds to the pre-pit 4 to be detected) from the pre-information signal Spp and accordingly output a corresponding demodulation pre-pit signal Spd.

As explained above, according to the information recording apparatus S, only the wobbling signal Sb is extracted from the pre-information signal Spp to thereby record the digital information Srr. Thus, even in a case of the DVD-R 1 in which the pre-pit 4 is formed on the land track 3, it is possible to exactly control the rotational speed of the DVD-R 1 on the basis of the extracted wobbling signal Sb and thereby record the digital information Srr.

The noise signals Sn1 and Sn2 are removed from the pre-information signal Spp by limiting the level of the pre-information signal Spp by use of the upper side limit signal Su1 and the lower side limit signal Sw1. Hence, the wobbling signal Sb can be extracted surely.

Moreover, each limit signal is converted in synchronization with the change of the pre-information signal Spp. Thus, it is possible to surely inhibit the noise signal Sn2 shown in the top row of FIG. 6 (since the noise signal Sn2 is the noise signal resulting from the pre-pit 4 which is not synchronized with the pre-information signal Spp, the noise signal Sn2 itself is not synchronized with the pre-information signal Spp. Hence, it is not known in advance at which position of the pre-information signal Spp the noise signal Sn2 occurs).

(III) Second Embodiment of Information Recording Apparatus

Next, a second embodiment according to the present invention is explained with reference to FIGS. 7 and 8. Incidentally, in FIGS. 7 and 8, the constitutional elements same as those in FIGs. 3 to 5 carry the same reference numerals, and the detailed explanations thereof are omitted.

The first embodiment is implemented such that the noise signals Sn1 and Sn2 are removed from the pre-information signal Spp by using the upper side limit signal Su1 and the lower side limit signal Sw1. The second embodiment is implemented such that an influence of a so-called dropout (a drop of a signal) occurring during detecting the pre-information (hereafter, this influence is referred to as a defect) can be reduced in addition to the removal of the noise signals Sn1 and Sn2.

Figure 7:
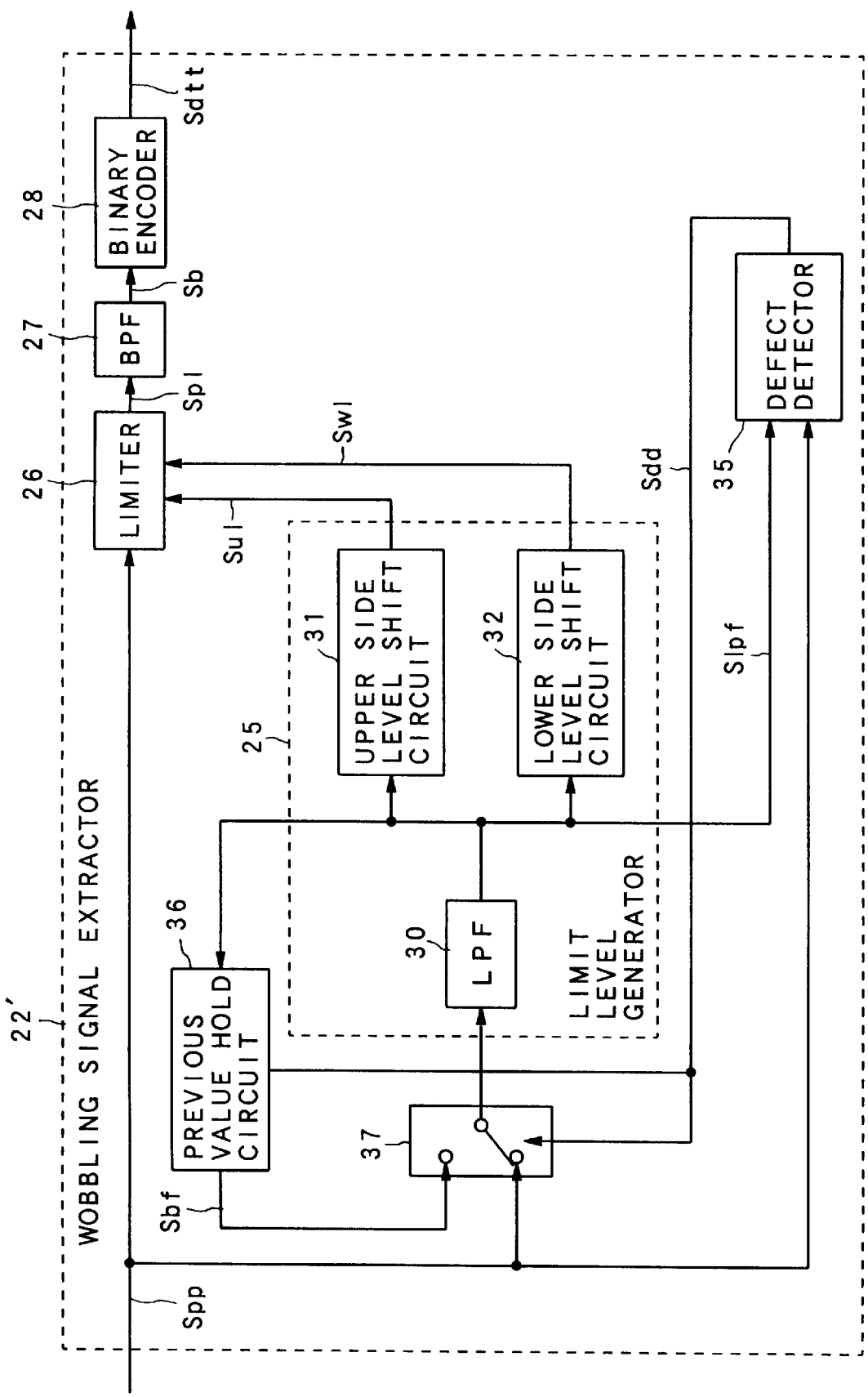
FIG. 7 is a block diagram showing a detailed configuration of a wobbling signal extractor in a second embodiment.

As shown in FIG. 7, in addition to the configuration of the wobbling signal extractor 22 in the first embodiment, a wobbling signal extractor 22' in the second embodiment is provided with: a defect detector 35 servicing as one example of a detecting device for detecting, on the basis of an LPF signal S1pf which is the output signal from the LPF 30, that the defect is included as a noise reproduction signal in the pre-information signal Spp, and then outputting a defect detection signal Sdd which becomes "H" when the defect is included; a previous value hold circuit 36 for holding the LPF signal S1pf and outputting to a switch 37 as a previous value signal Sbf the held LPF signal S1pf when the defect detection signal Sdd becomes "H"; and the switch 37 servicing as one example of an outputting device for outputting the previous value signal Sbf to the LPF 30, when the defect detection signal Sdd is "H", and outputting to the LPF 30 the pre-information signal Spp as it is, when the defect detection signal Sdd is "L", on the basis of the defect detection signal Sdd.

Figure 8A:
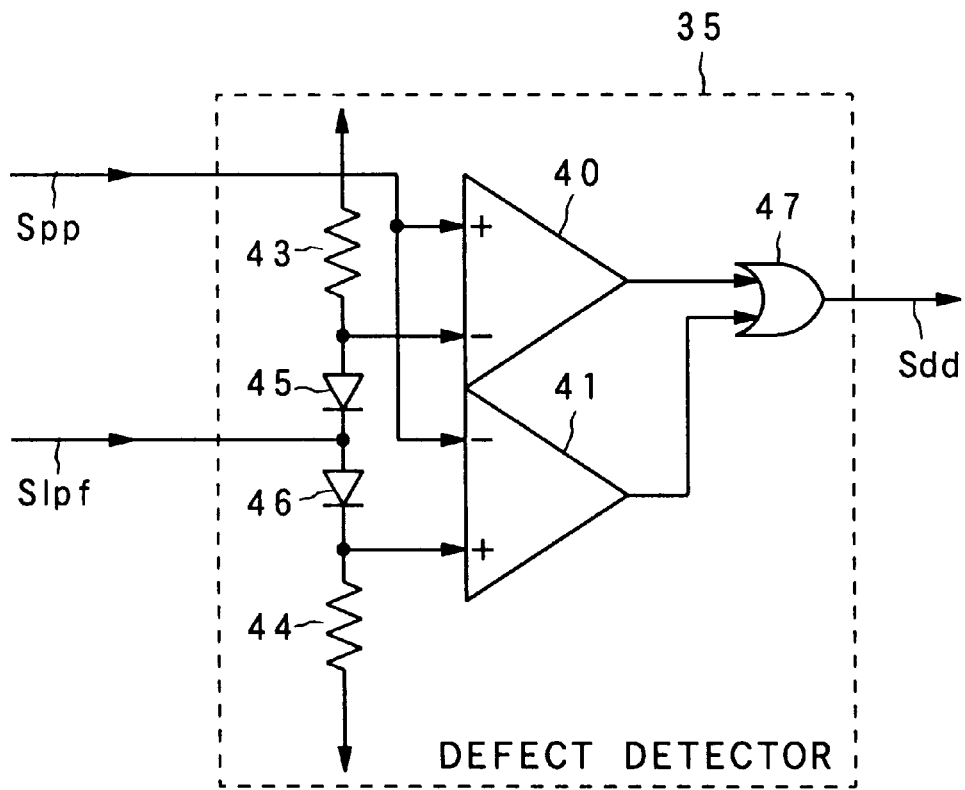
FIG. 8A is a circuit diagram showing a configuration of a defect detector in the second embodiment.

As shown in FIG. 8A, the defect detector 35 is provided with: diodes 45 and 46 for respectively applying a voltage shift to the LPF signal S1pf to thereby generate window signals; window comparators 40 and 41 for comparing the window signals with the pre-information signal Spp; an OR circuit 47 for outputting as the defect detection signal Sdd a logical sum of respective output signals from the window comparators 40 and 41; and resistors 43 and 44.

Figure 8B:
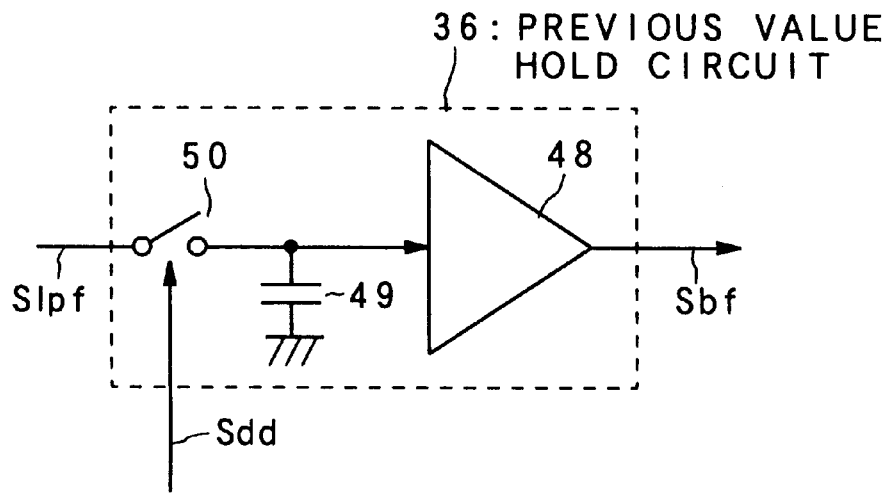
FIG. 8B is a circuit diagram showing a configuration of a previous value hold circuit in the second embodiment.

As shown in FIG. 8B, the previous value hold circuit 36 is provided with: a switch 50 which is on at a usual state and is off when the defect detection signal Sdd is "H"; a capacitor 49 for holding the voltage value of the LPF signal S1pf inputted at the usual state; and a buffer 48 for outputting the LPF signal S1pf as the previous value signal Sbf as it is, at the usual state, and further outputting as the previous value signal Sbf the voltage value held by the capacitor 49 when the defect detection signal Sdd is "H".

Next, an operation of the wobbling signal extractor 22'is explained.

In the usual state when the defect is not included in the pre-information signal Spp, the pre-information signal Spp is included in the window signal generated by the defect detector 35. Thus, the output from the OR circuit 47 (i.e., the defect detection signal Sdd) is always "L". Hence, at the usual state, the switch 37 outputs the inputted pre-information signal Spp as it is, to the LPF 30. The wobbling signal extractor 22' performs the extracting operation of the wobbling signal similarly to the wobbling signal extractor 22 in the first embodiment to thereby output the wobbling signal Sb. At this usual case, the switch 50 within the previous value hold circuit 36 is also on. Thus, the previous value hold circuit 36 holds the voltage value of the inputted LPF signal S1pf, and outputs it as the previous value signal Sbf to the switch 37 as it is.

On the other hand, if a pre-information signal Spp, which includes the defect due to an error or the like at the time of the detection, is inputted, the pre-information signal Spp is not included in the window signal at the defect detector 35. Hence, the defect detection signal Sdd becomes "H" at this time. Thus, since the switch 50 in the previous value hold circuit 36 is turned off, the voltage value of the LPF signal S1pf immediately before the switch 50 is turned off (i.e., the voltage value of the LPF signal S1pf corresponding to the pre-information signal Spp immediately before the defect is included), which is held by the condenser 49, is outputted to the switch 37 as the previous value signal Sbf through the buffer 48. Then, at this time, the switch 37 is switched to the previous value signal Sbf side since the defect detection signal Sdd is "H". Therefore, the inputted previous value signal Sbf is outputted to the LPF 30. After that, the upper side limit signal Su1 and the lower side limit signal Sw1 are generated by the limit level generator 25, on the basis of the inputted previous value signal Sbf, and thereby they are outputted to the limiter 26. As a result, the value of the pre-information signal Spp is limited to thereby remove the noise signals Sn1 and Sn2.

Since a configuration and an operation of the wobbling signal extractor 22' other than the above mentioned configuration and operation are similar to those of the wobbling signal extractor 22, detailed explanations thereof are omitted.

As explained above, according to the wobbling signal extractor 22' of the second embodiment, in addition to the effect of the information recording apparatus S in the first embodiment, when the pre-information signal Spp including the defect is outputted by the pickup 10, the previous value signal Sbf is outputted to the limit level generator 25 to thereby extract the wobbling signal Sb on the basis of the LPF signal S1pf in which the defect is not included.

Incidentally, the case in which a wobbling frequency of the relative groove track 2 within one synchronization frame is set to a single wobbling frequency $f_0$ is explained in the above mentioned respective embodiments. However, the wobbling frequency is not limited thereto. For example, if there are a plurality of types of wobbling frequencies in the relative groove track 2 within one synchronization frame and then a combination of the wobbling frequencies is changed for each synchronization frame, it is possible to include the rotational control information as well as the address information, as the information recorded by the wobbling operation of the groove track 2.

More actually, for example, a wobbling frequency at a former portion of the groove track 2 corresponding to one synchronization frame is set to the wobbling frequency $f_0$. Then, the spindle motor 14 is rotation-controlled by detecting the wobbling signal of the wobbling frequency $f_0$. Further, a wobbling frequency at a latter portion of the groove track 2 corresponding to the one synchronization frame is set to any one of two types of frequencies other than the wobbling frequency $f_0$. Then, a combination of the mutual synchronization frames having the two types of the frequencies is changed on the basis of the address information to be included. Accordingly, the address information can be recorded as the change of the wobbling frequency. Then, when recording the digital information Srr, by detecting a combination situation of the wobbling frequencies, it is possible to detect the beforehand the recorded address information to thereby record the digital information Srr.

Moreover, the case in which the present invention is applied to the DVD-R 1 is explained in the above mentioned respective embodiments. However, it is not limited thereto. For example, it can be widely applied to a case in which determined digital information is recorded onto a record medium (for example, a record medium in a form of a tape and the like) on which the information for a record control through a wobbling operation to a track is recorded.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus for recording record information onto a record medium, on which a moving control information to control a moving speed of said record medium when recording the record information onto said record medium is recorded by wobbling an information track, where the record information is to be recorded on said record medium, at a frequency corresponding to the moving control information, and on which a record control information to control recording or reproducing the record information onto or from said record medium is also recorded in advance by forming a pre-pit on an adjacent track, which is adjacent to said information track, said information recording apparatus comprising:

a pickup device for simultaneously emitting a light beam onto said information track and said adjacent track and then outputting a reproduction signal based on a reflection light from said information track and said adjacent track of the emitted light beam;

an information extracting device for extracting the moving control information from the outputted reproduction signal;

a moving control device for controlling the moving speed of said record medium on the basis of the extracted moving control information; and a recording device for recording the record information onto said record medium while said record medium is moved at the controlled moving speed, wherein said information extracting device comprises:

a generating device for generating a limit signal, which has a limit level to remove a signal corresponding to the record control information out of the outputted reproduction signal:

a limiting device for limiting a level of the outputted reproduction signal on the basis of the generated limit signal to thereby output a limit reproduction signal; and an extracting device for extracting the moving control information out of the outputted limit reproduction signal.

2. An information recording apparatus according to claim 1 wherein the limit signal has the limit level corresponding to the outputted reproduction signal.

3. An information recording apparatus according to claim 1, further comprising:

a detecting device for detecting whether or not a noise reproduction signal, which is the outputted reproduction signal having a level beyond a level range set in advance, is outputted to thereby output a detection signal indicating that the noise reproduction signal is outputted; and an outputting device for outputting a previous reproduction signal, which is the outputted reproduction signal previous to the noise reproduction signal, to said information extracting device when the detection signal is outputted.

4. An information recording apparatus according to claim 1, wherein the record control information includes record position information indicative of a position on said record medium where the record information is to be recorded.

5. An information recording apparatus according to claim 1, wherein said record medium comprises a record medium shaped in a disc, said information recording apparatus further comprises a rotating device for rotating said record medium when recording the record information onto said record medium under a control of said moving control device, and the moving control information is rotational control information to control a rotational number of said record medium.

6. An information recording apparatus according to claim 1, wherein said record medium comprises a DVD.

7. An information recording apparatus according to claim 1, wherein one of said information track and said adjacent track comprises one of a land track and a groove track formed on said record medium, and the other of said information track and said adjacent track comprises the other of said land track and said groove track.

* * * * *